United States Patent [19]

Ito

[11] Patent Number: 4,720,179
[45] Date of Patent: Jan. 19, 1988

[54] ZOOM LENS SYSTEM FOR USE WITH A COMPACT CAMERA

[75] Inventor: Takayuki Ito, Tokyo, Japan
[73] Assignee: Asahi Kogaku Kogyo Kabushiki Kaisha, Japan
[21] Appl. No.: 935,982
[22] Filed: Nov. 28, 1986
[30] Foreign Application Priority Data
Nov. 28, 1985 [JP] Japan .................. 60-268473
[51] Int. Cl.$^4$ .......................................... G02B 15/14
[52] U.S. Cl. ...................................... 350/423; 350/426
[58] Field of Search ........................... 350/423, 426
[56] References Cited
FOREIGN PATENT DOCUMENTS
128911 10/1981 Japan .
170816 9/1985 Japan .
191216 9/1985 Japan .

*Primary Examiner*—John K. Corbin
*Assistant Examiner*—Yong K. Choi
*Attorney, Agent, or Firm*—Sughrue, Mion, Zinn, Macpeak and Seas

[57] ABSTRACT

Two lens groups the distance between which is changed during zooming. The first lens group closest to the object has a positive focal length and comprises, from the object side, a negative length first lens unit of positive and negative elements, a second lens unit of at least one positive element and a positive focal length third lens unit of positive and negative elements. The second lens group has a negative focal length and comprises one positive and two negative meniscus elements. Eight conditions are imposed on the focal lengths, the refractive indices and the Abbe numbers.

13 Claims, 28 Drawing Figures

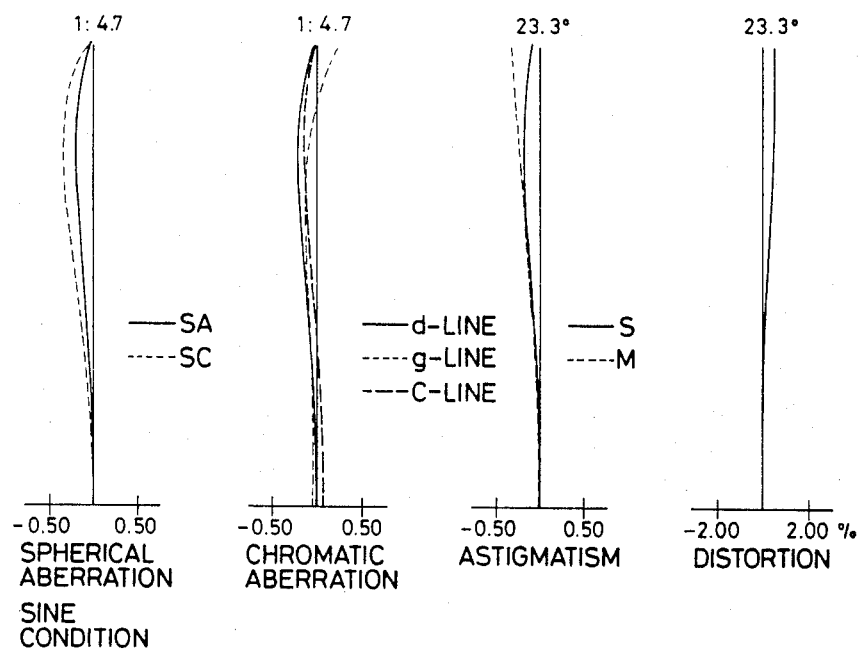
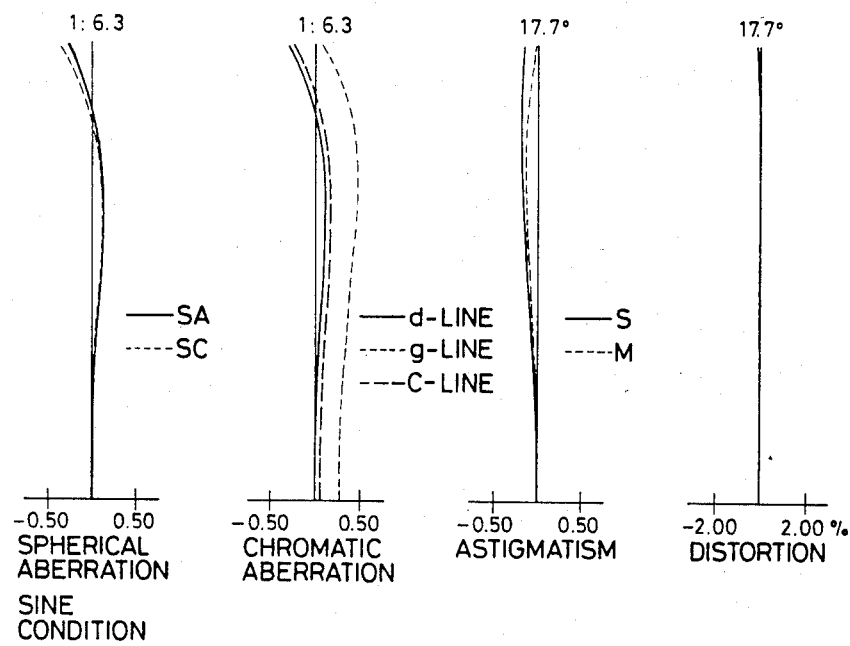

ZOOM LENS SYSTEM FOR USE WITH A COMPACT CAMERA

BACKGROUND OF THE INVENTION

1. Field of the Invention

The present invention relates to a zoom lens system that is suitable for use with a compact camera and which has a smaller degree of constraint on back focus than when it is used with a single-reflex lens camera.

2. Background of the Invention

The following three types of zoom lens system have heretofore been proposed for use with compact cameras. The first type is a telephoto zoom lens composed of two lens groups, the first group having a positive focal length inclusive of a stop diaphragm and the second lens group having a negative focal length. Examples of this first type are shown in Unexamined Published Japanese Patent Application Nos. 128911/1981, 201213/1982, 48009/1985, 170816/1985 and 191216/1985. The second type is a modification of the first type and is a composed of three lens groups. The first group has a positive focal length inclusive of a stop diaphragm. The second lens group also has a positive focal length and the third lens group has a negative focal length. An example of this second type is shown in Unexamined Published Japanese Patent Application No. 184916/1983. The third type is composed of four lens groups, the first group having a positive focal length, the second group having a negative focal length, the third group having a positive focal length and the fourth group having a negative focal length. An example of this third type is shown in Unexamined Published Japanese Patent Application No. 57814/1985.

However, these three types of conventional zoom lens system adapted to compact cameras have their own problems as described below. The first type which is composed of two lens groups features a very simple lens configuration but the first and second lens groups must be displaced by great amounts during zooming. The second type is a modification of the first type in that the first lens group is divided into two groups, each having a positive focal length and the amount by which each of the lens groups must displaced during zooming is no smaller than in the first type. The third type which is composed of four lens groups has the advantage that the individual lens groups need to be displaced by smaller amounts than in the first and second types. However, this type of lens system is difficult to manufacture for two reasons. First, its lens arrangement is complex. Secondly, the four lens groups, particularly the second and third lens groups, have such great powers that poor workmanship can cause substantial effects on the performance of the final product.

In practical applications, the zoom lens systems of all three types have one common problem in that, being intended for use with compact cameras, their design does not include any constraint on back focus. In an extreme case, the back focus is as small as about 1 mm. The absence of any constraint on back focus is advantageous for the purpose of reducing the overall length of the system but, on the other hand, the lens diameter of the rear group is increased and the overall size of the camera including the mechanisms of zooming, autofocusing and other capabilities will by no means be smaller than when certain constrains on back focus exist. Another problem associated with the absence of any constraints on back focus is that it increases the chance of internal reflections occurring between the film surface and the surfaces of lenses in the rear group.

In order to solve these problems of the prior art zoom lens systems for use with compact cameras, the applicant of the present application previously accomplished an invention which is described in Japanese Patent Application No. 232459/1985 (hereinafter referred to as the prior application). According to the embodiments shown in the specification of the prior application, the claimed system is capable of attaining zoom ratios of the order of 1.6. However, there still exists the need of consumers generally for a zoom lens having a greater zoom ratio. If an attempt is made to attain a larger zoom ratio by the lens configurations shown in the embodiments of the prior application, the amounts of aberrations such as coma aberration and distortion are increased. Therefore, there is room for improvement in the proposal of the prior application in order for it to satisfy the consumer's need for attaining a zoom lens system having a zoom ratio greater than 1.6.

SUMMARY OF THE INVENTION

An object, therefore, of the present invention is to provide a zoom lens system for use with a compact camera that is composed of two lens groups as in the case of the previously described conventional second type and which features a reduced overall length of the lens arrangement in spite of the fact that the back focus is made longer than a certain limit [as will be defined by condition (8)] in order to decrease the lens diameter of the rear group. The zoom lens system of the present invention achieves a zoom ratio of 1.7 or more and yet allows effective compensation of aberrations such as coma aberration and distortion.

The zoom lens of the present invention comprises two lens groups the distance between which is changed during zooming. The first lens group closest to the object has a positive focal length and comprises, from the object side, a negative length first lens unit of positive and negative elements, a second lens unit of at least one positive element and a positive focal length third lens unit of positive and negative elements. The second lens group has a negative focal length and comprises one positive and two negative meniscus elements. Eight conditions are imposed on the focal lengths, the refractive indices and the Abbe numbers.

BRIEF DESCRIPTION OF THE DRAWINGS

FIGS. 8A, 8B and 8C are graphs plotting the aberrational curves obtained at the wide angle, middle angle and narrow angle positions, respectively, of the zoom lens system constructed according to the first embodiment of the present invention;

DETAILED DESCRIPTION OF THE PREFERRED EMBODIMENTS

Figure 1:
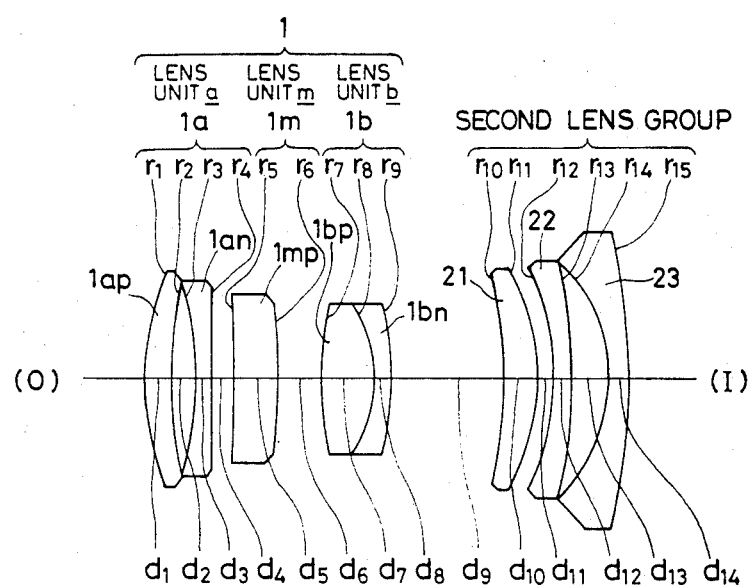
FIGS. 1, 3, 5, 7, 9, 11 and 13 are simplified cross-sectional views of the zoom lens system according to the four embodiments of the present invention.
Figure 2A:
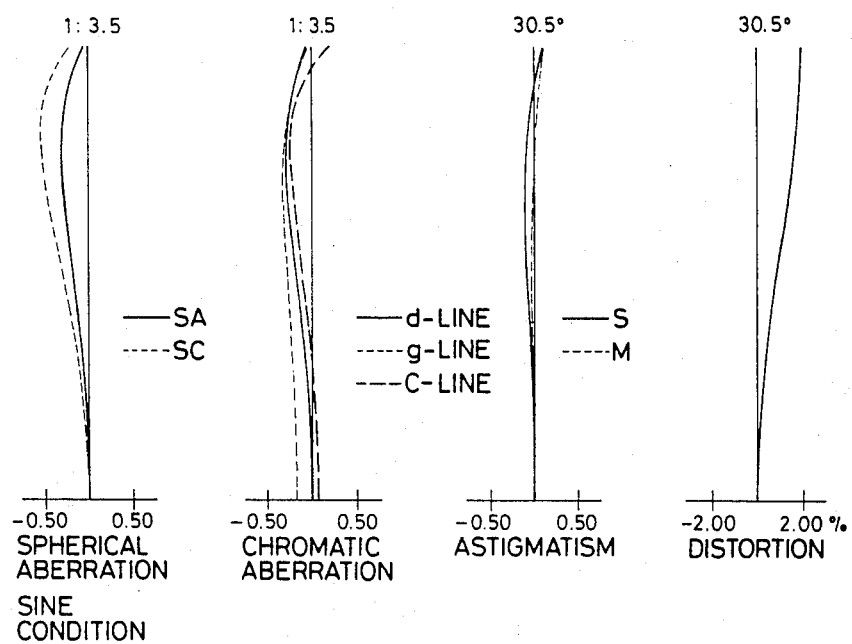
FIGS. 2A, 2B and 2C are graphs plotting the aberrational curves obtained at the wide angle, middle angle and narrow angle positions, respectively, of the zoom lens system constructed according to the first embodiment of the present invention.
Figure 2B:
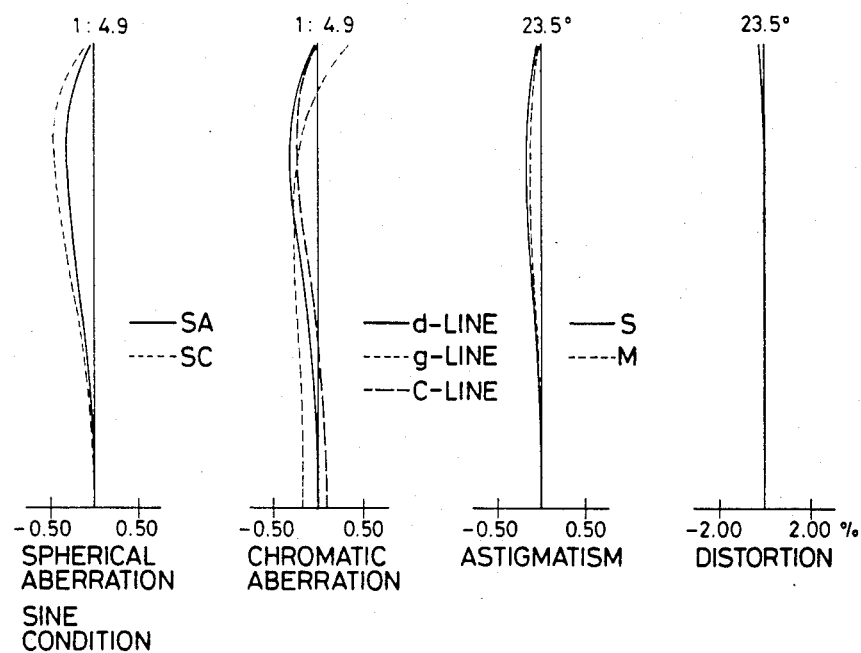
Figure 2C:
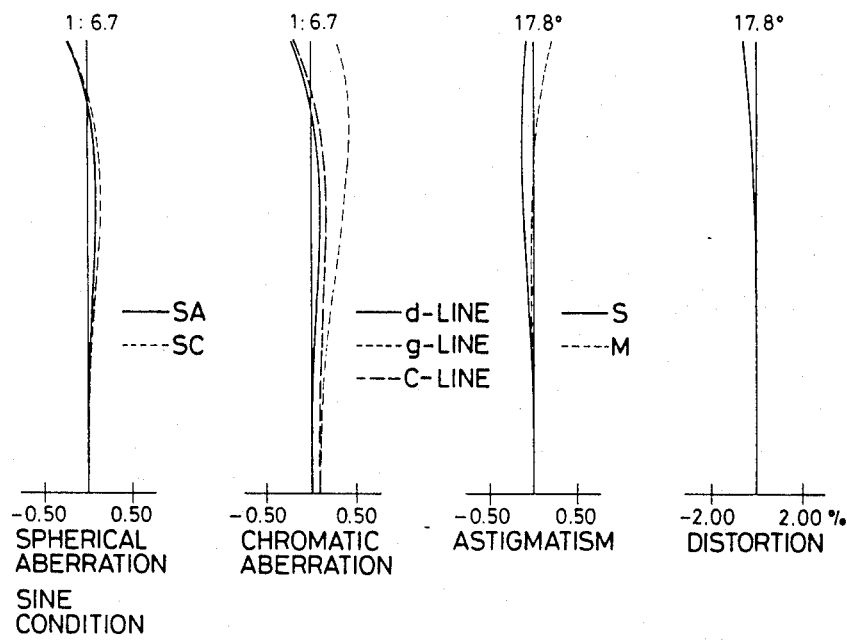

As shown in any of FIGS. 1, 3, 5, 7, 9, 11, and 13, the zoom lens system of the present invention for use with a compact camera comprises in order from the object side, a first lens group 1 having a positive focal length and a second lens group 2 having a negative focal length and which achieves zooming by changing the distance between the first and second lens groups 1 and 2. The first lens group 1 has a positive focal length and is composed of a lens unit a having a negative focal length that is positioned on the object side and which is comprised of at least one positive lens element 1ap and at least one negative lens element 1an, a lens unit 1b having a positive focal length that is positioned on the image side and which is comprised of at least one negative lens element 1bn and at least one positive lens element 1bp, and a lens unit 1m that is positioned between the lens units 1a and 1b and which is comprised of at least one positive lens element 1mp having its convex surface directed toward the image side. The lens system satisfies the following conditions:

(1) $1.35 < f_s/f_1 < 1.7$;
(2) $1.69 < N_{1an}$;
(3) $34 < \nu_{1an}$;
(4) $-2.0 < f_s/f_{1bn} < -0.7$;
(5) $9 < \nu_{1bp} - \nu_{1bn}$;
(6) $0.23 < f_{Bs}/f_s < 0.5$; and
(7) $0.3 < f_s/f_{1m} < 1.0$ where $f_s$: the focal length of the overall system at the wide angle position;

$f_1$: the focal length of the first lens group;

$N_{1an}$: the refractive index at d-line of the negative lens element in the lens unit 1a;

$\nu_{1an}$: the Abbe number of the negative lens element in the lens unit 1a;

$f_{1bn}$: the focal length of the negative lens element in the lens unit 1b;

$\nu_{1bp}$: the Abbe number of the positive lens element in the lens unit 1b;

$\nu_{1bn}$: the Abbe number of the negative lens element in the lens unit 1b;

$f_{Bs}$: the back focus at the wide angle position; and $f_{1m}$: the focal length of the lens unit 1m;

The second lens group 2 has a negative focal length and is composed of, in order from the object side, a positive meniscus lens element 21 which has a large curvature and which has its convex surface directed toward the image side and at least two negative meniscus lens elements 22 and 23 which have a large curvature and each of which has its concave surface directed toward the object side. The said second lens group satisfies the following condition:

(8) $1.7 < \overline{N_{2n}}$ where $\overline{N_{2n}}$: the average of the refractive indices at d-line of the negative lens elements in the second lens group 2.

Figure 3:
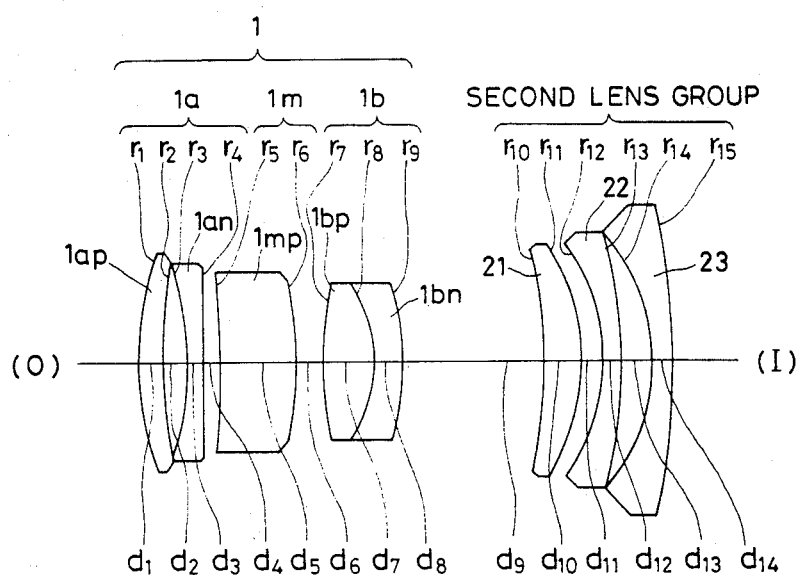
Figure 4A:
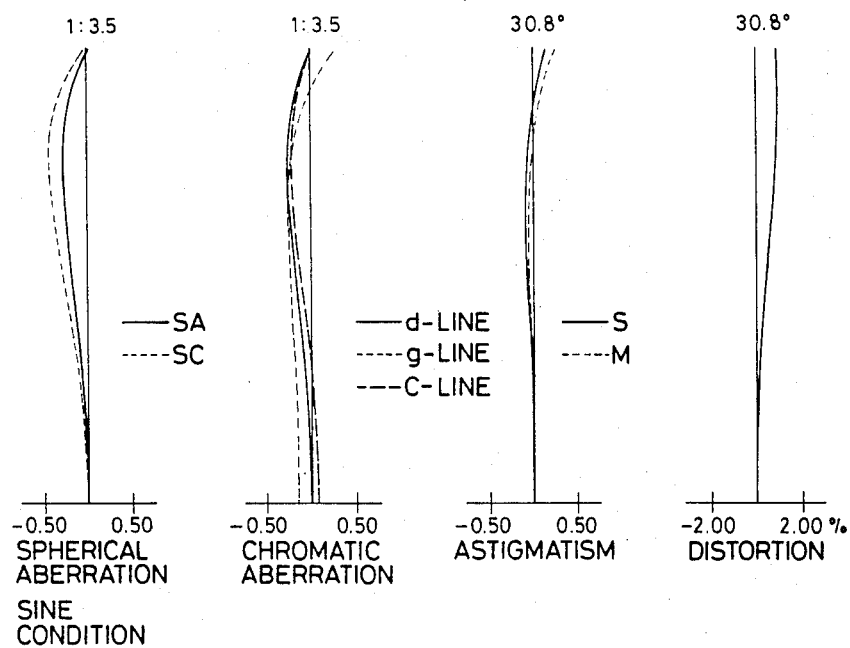
FIGS. 4A, 4B and 4C are graphs plotting the aberrational curves obtained at the wide angle, middle angle and narrow angle positions, respectively, of the zoom lens system constructed according to the second embodiment of the present invention.
Figure 4B:
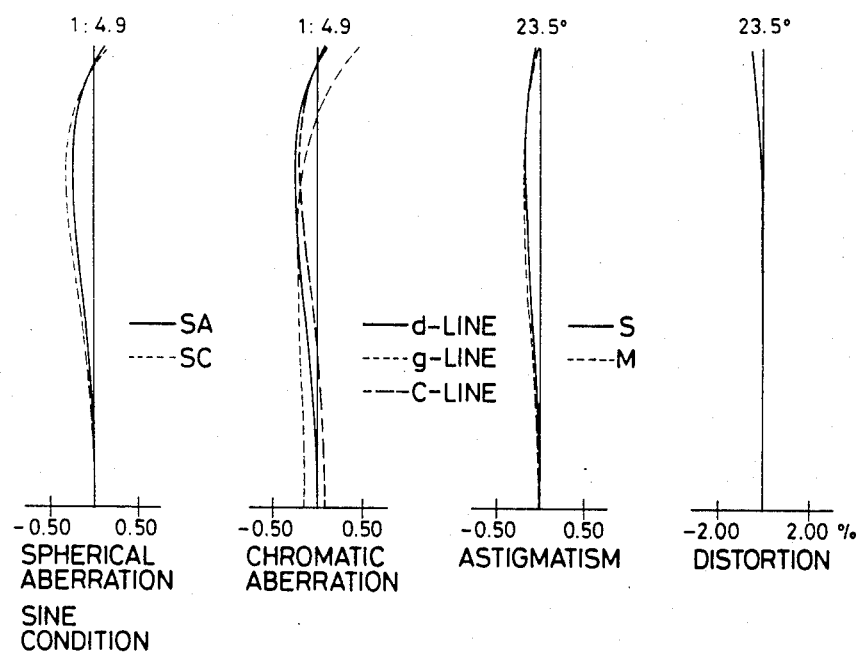
Figure 4C:
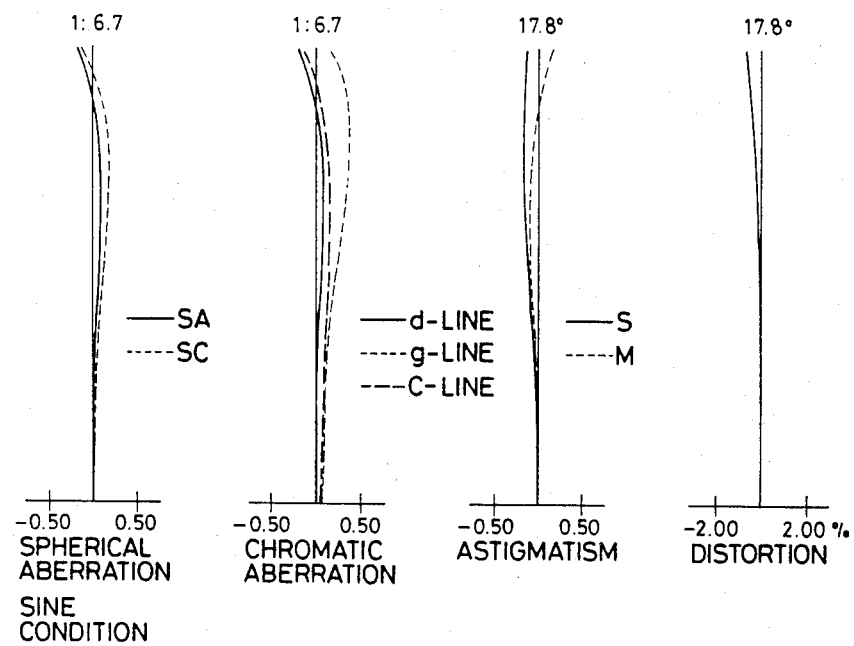
Figure 5:
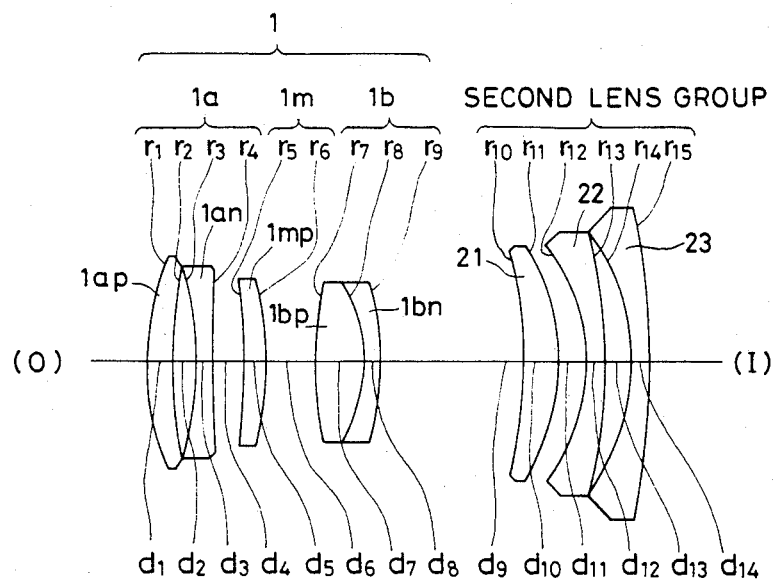
Figure 6A:
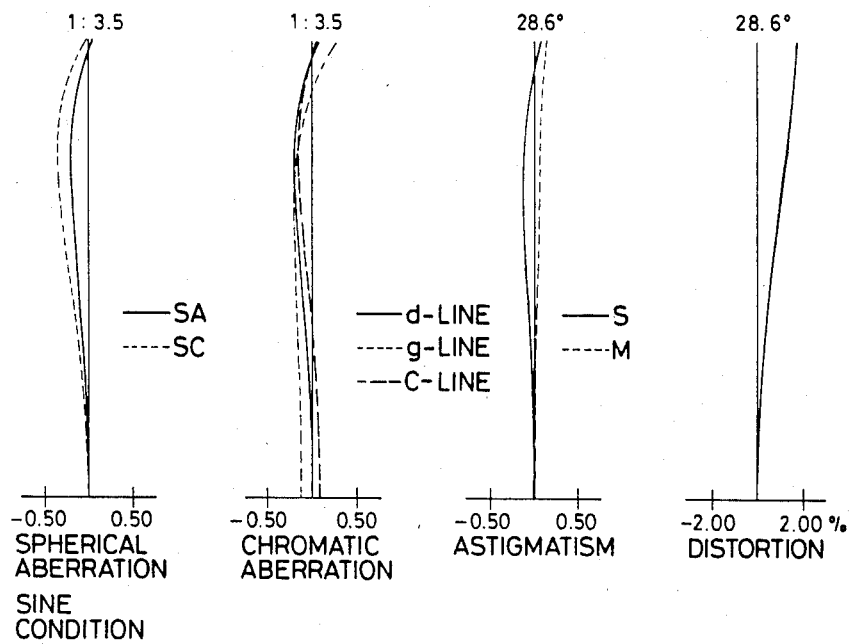
FIGS. 6A, 6B and 6C are graphs plotting the aberrational curves obtained at the wide angle, middle angle and narrow angle positions, respectively, of the zoom lens system constructed according to the third embodiment of the present invention.
Figure 6B:
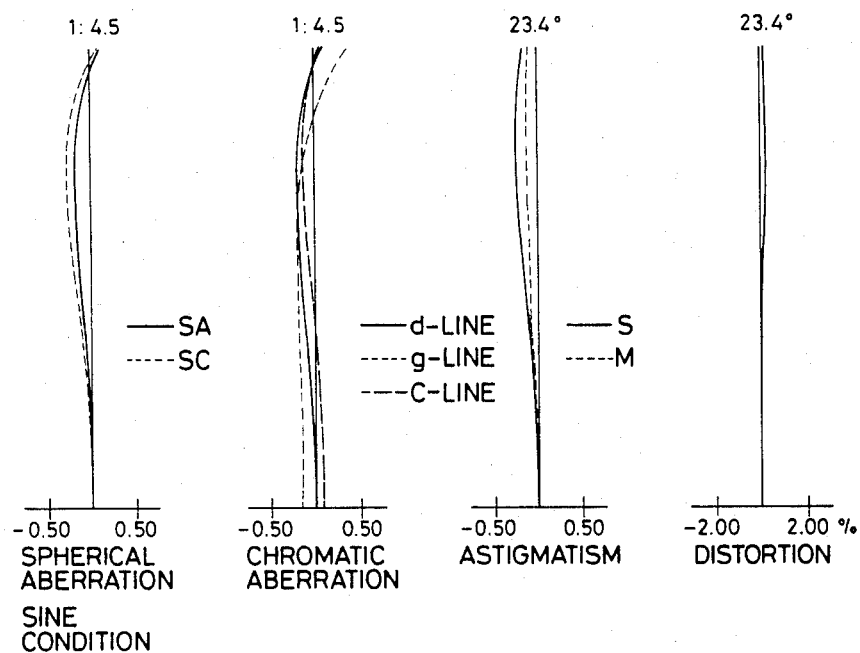
Figure 6C:
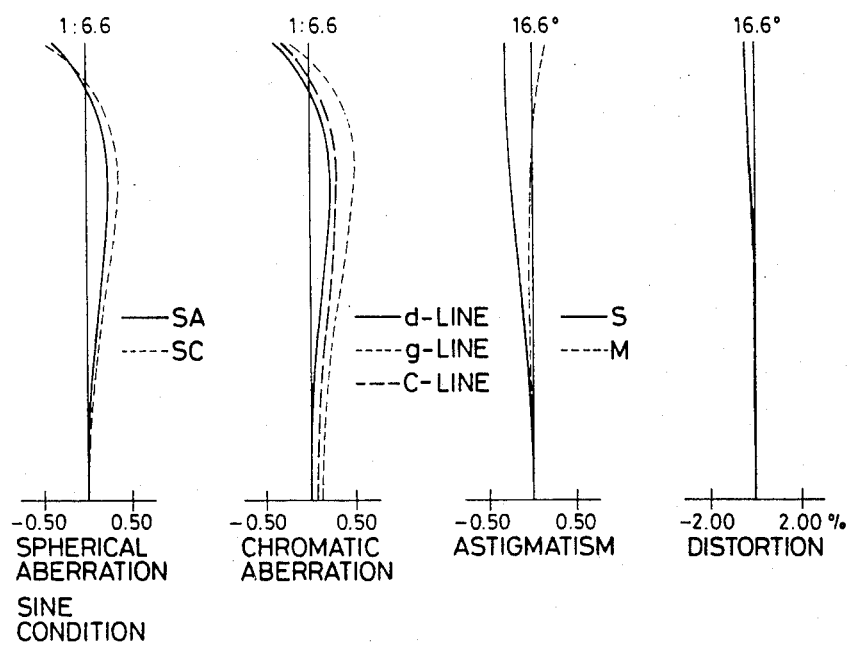
Figure 7:
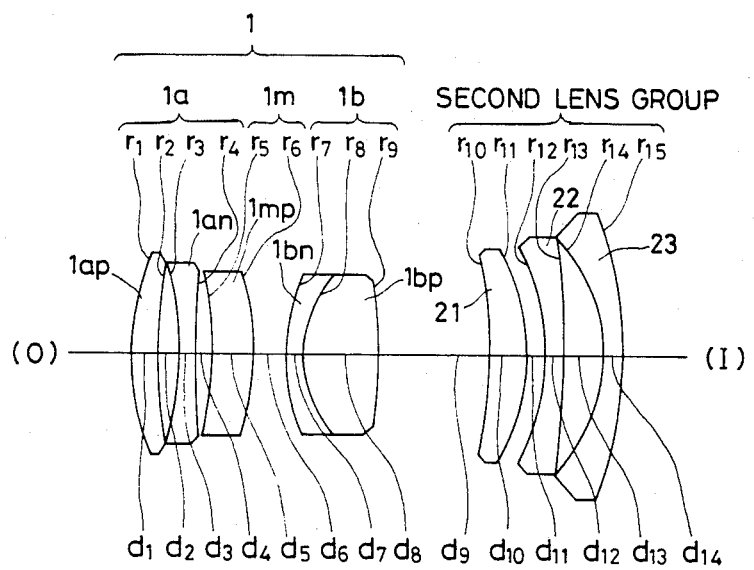
Figure 8A:
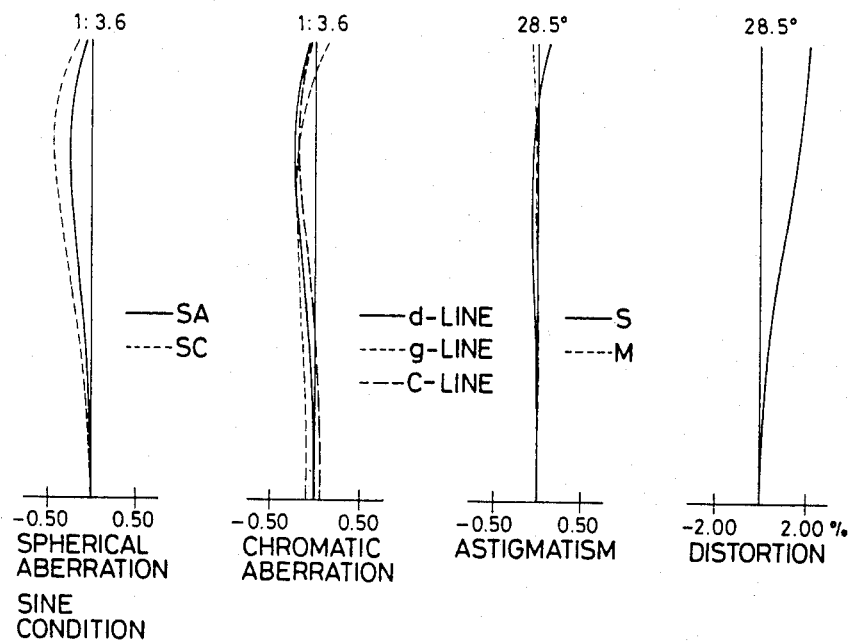
Figure 9:
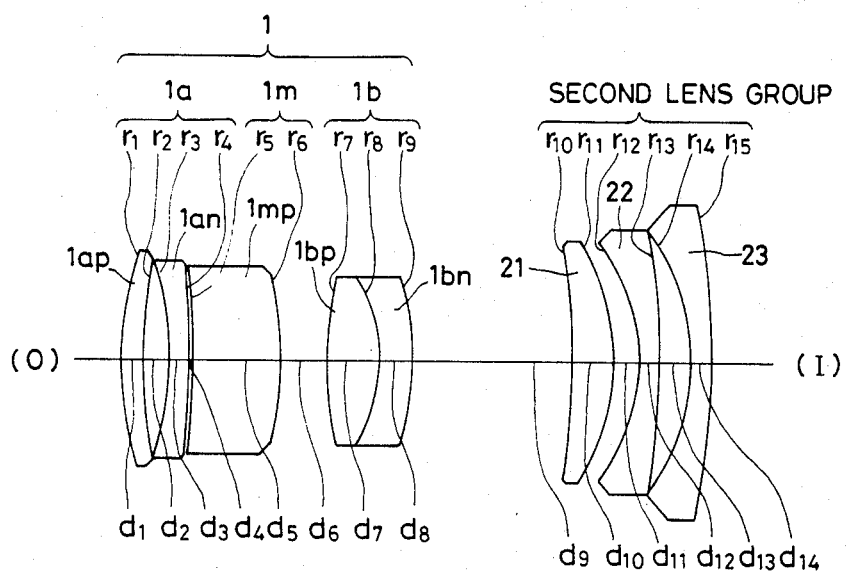
Figure 10A:
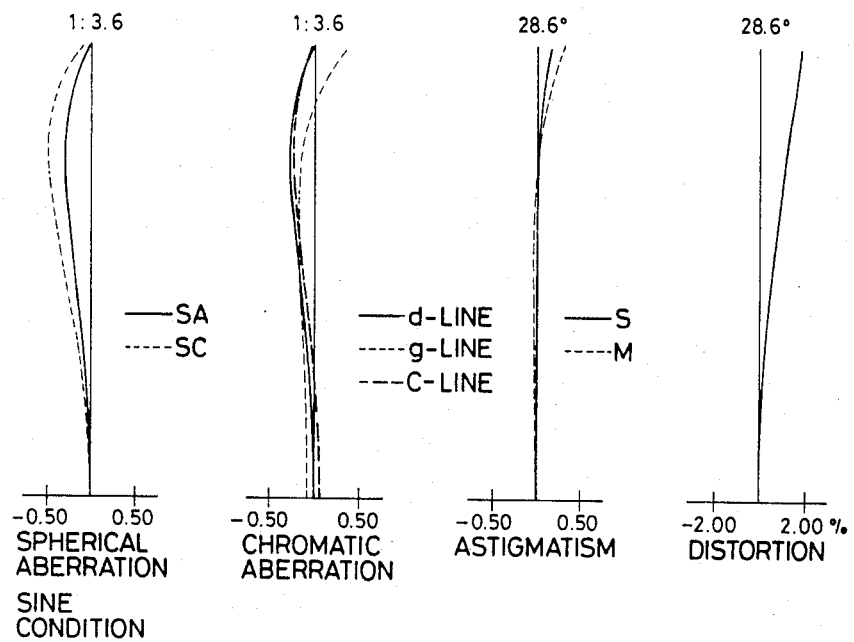
FIGS. 10A, 10B and 10C are graphs plotting the aberrational curves obtained at the wide angle, middle angle and narrow angle positions, respectively, of the zoom lens system constructed according to the second embodiment of the present invention.
Figure 10B:
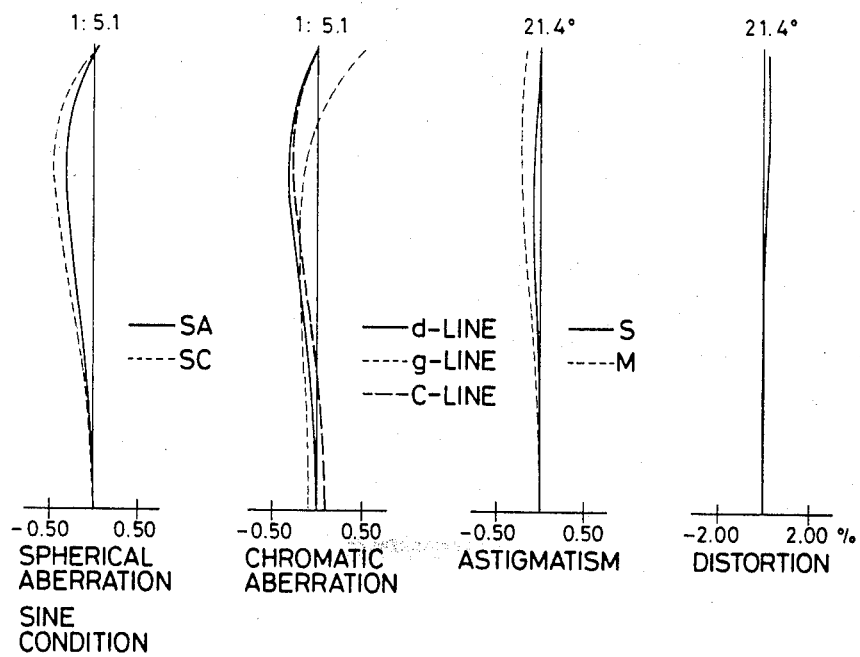
Figure 10C:
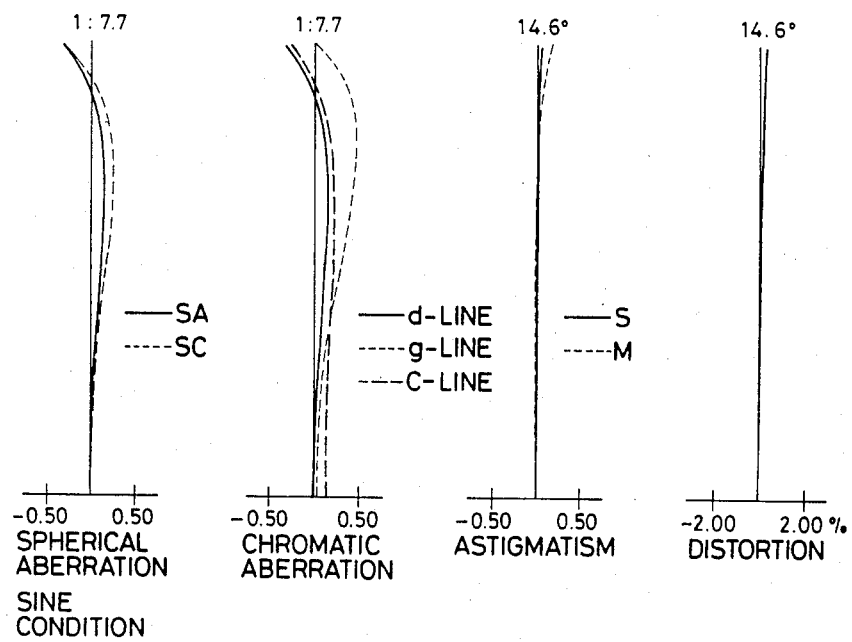
Figure 11:
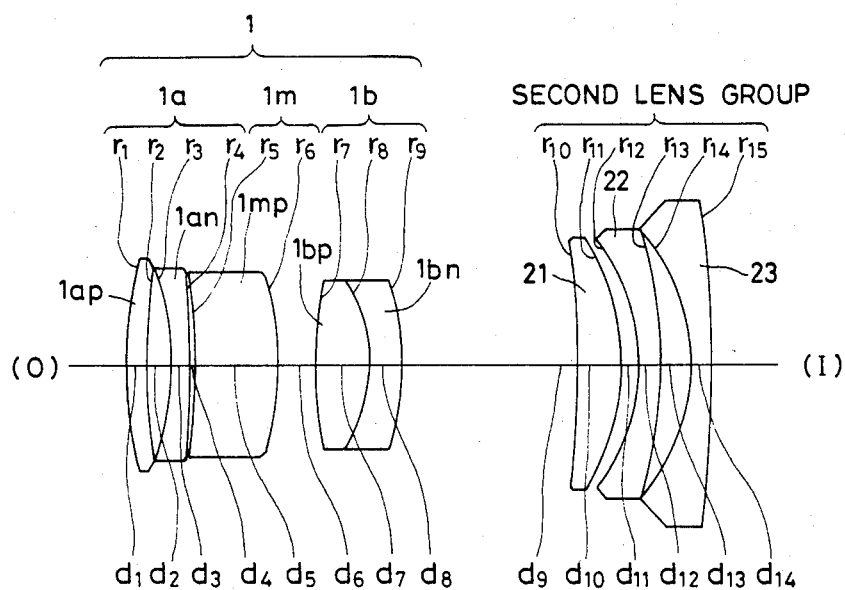
Figure 12A:
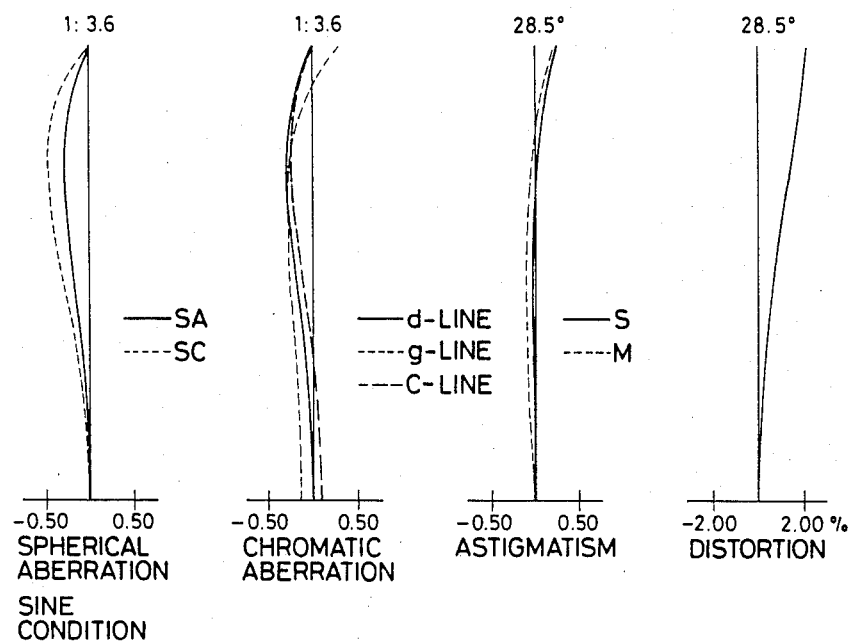
FIGS. 12A, 12B and 12C are graphs plotting the aberrational curves obtained at the wide angle, middle angle and narrow angle positions, respectively, of the zoom lens system constructed according to the third embodiment of the present invention.
Figure 12B:
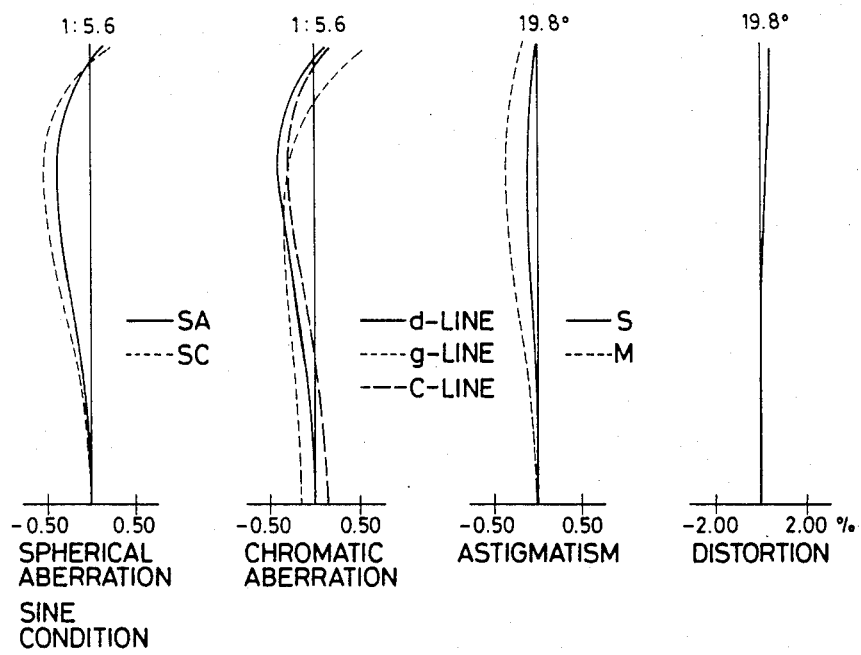
Figure 12C:
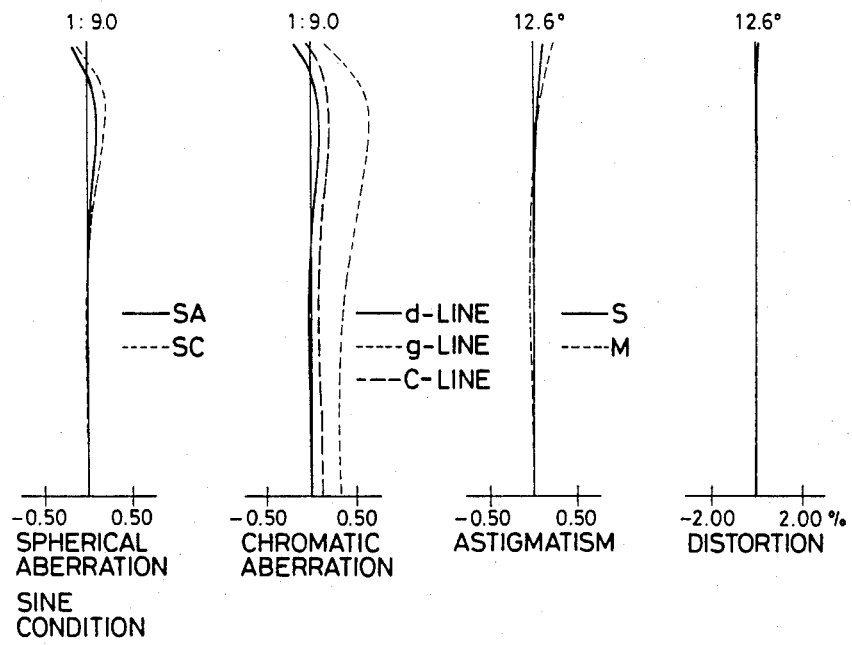
Figure 13:
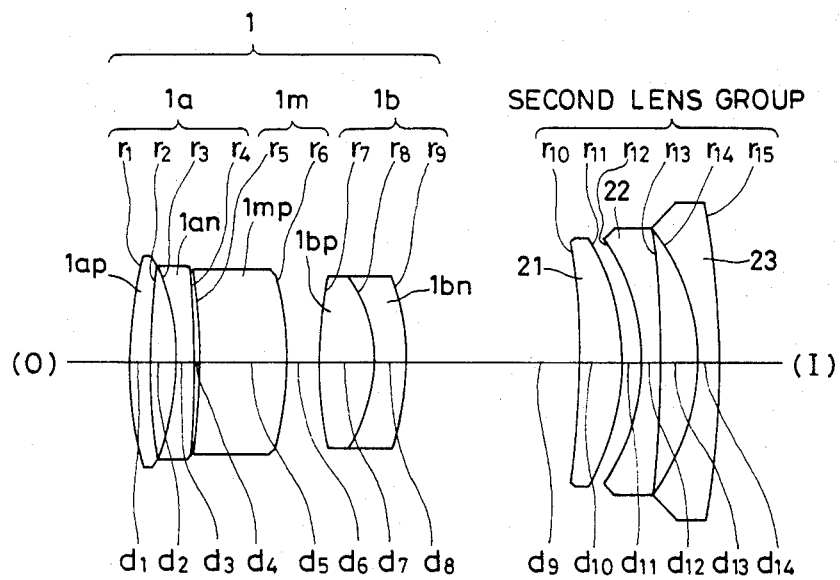
Figure 14A:
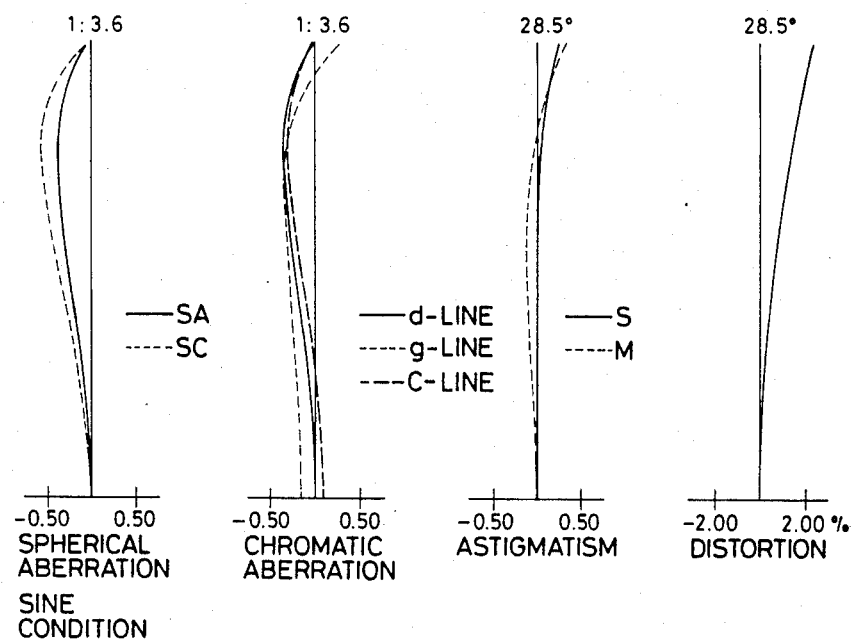
FIGS. 14A, 14B and 14C are graphs plotting the aberrational curves obtained at the wide angle, middle angle and narrow angle positions, respectively, of the zoom lens system constructed according to the fourth embodiment of the present invention.
Figure 14B:
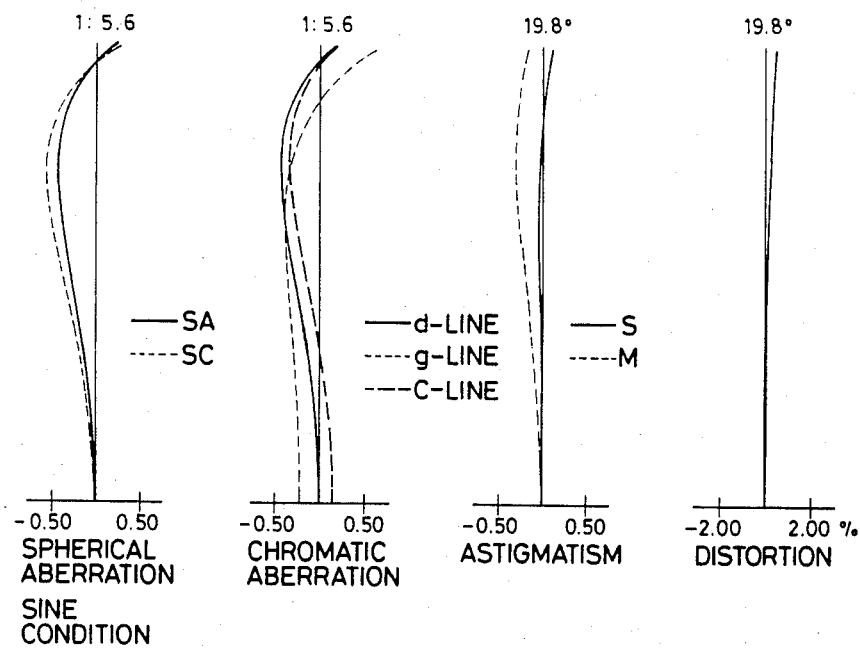
Figure 14C:
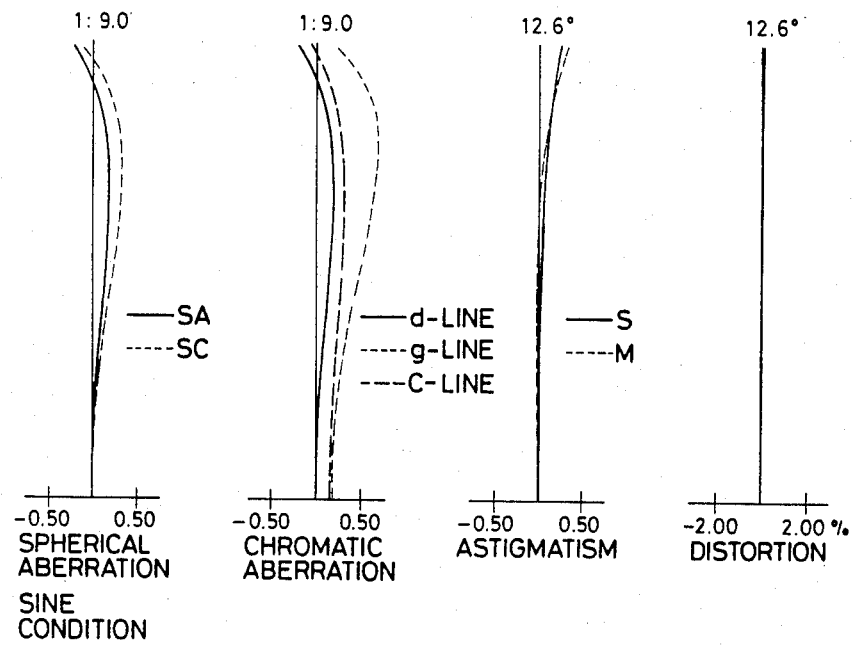

In preferred embodiments, the lens unit 1a has a negative focal length and comprises, in order from the object side, a positive lens element 1ap with a large curvature with its convex surface directed toward the object side and a negative lens element 1an with a large curvature with its concave surface directed toward the object side. The lens unit 1b has a positive focal length and comprises, in order from the object side, a negative meniscus lens element 1bn which has its convex surface directed toward the object side and a bioconvex positive lens 1bp cemented thereto (as illustrated in FIG. 7), or a bioconvex positive lens element 1bp and a negative meniscus lens element 1bn cemented thereto which has its concave surface directed to the object side (as illustrated in FIGS. 1, 3 and 5).

The present invention aims at providing a significantly large back focus and yet reducing the overall length of the lens arrangement while achieving satisfactory performance. In order to attain these aims, the invention selects an unconventional optical material for use as the glass of which the lens unit 1a in the first lens group 1 is made. In addition, the lens unit 1b in the first lens group 1 which is conventionally composed of either a single positive lens element or two or three positive lens elements alone is comprised of at least one negative lens element 1bn and at least one positive lens element 1bp.

Condition (1) shows the requirement that has to be met by the power of the first lens group 1. In accordance with the present invention, the lens unit 1m having a positive focal length is disposed between the two lens units 1a and 1b which have been the sole components of the first lens group 1 in the system of the prior application. This additional lens unit 1m allows the first lens group 1 to provide a greater power without increasing the aberrational variations that may take place during zooming. If the upper limit of condition (1) is exceeded, favorable conditions for attaining a compact lens system are achieved but, on the other hand, the power of the first lens group 1 becomes too great to inhibit an unwanted increase in spherical and coma aberrations during zooming. If the lower limit of condition (1) is not reached, favorable conditions for achieving effective compensation of aberrations are provided. However, the change in the focal length of the overall system relative to the change in the distance between the first and second lens groups 1 and 2 is decreased and, as in the case of the prior art system, the amounts by which the first and second lens groups have to be displaced during zooming are significantly increased to render it impossible to provide a compact zoom lens system capable of attaining a zoom ratio of 1.7 or more.

Conditions (2) and (3) set forth the requirements that have to be satisfied by the negative lens element 1an or elements in the lens unit 1a. If condition (2) is not met, the chance of an excessive field curvature occurring at the wide angle position is increased and a particular problem results from the excessive astigmatism occurring in the sagittal direction at a maximum viewing angle.

Condition (3) as well as condition (2) place a constraint on the scope of optical materials which can be used as the glass material of the negative lens element $1an$ or elements in the lens unit $1a$. Common sense in the art has dictated that the negative lens elements in a lens group having a positive focal length be made of an optical material based on dense flint glass (SF) that does not satisfy condition (3). However, this is not suited to the purpose of providing a definitely large back focus [which satisfies condition (6)] while reducing the overall length of the lens arrangement because any chromatic aberration that occurs in undercompensated at the wide angle position and overcompensated at the narrow angle position. Condition (3) is important in that effective compensation of chromatic aberration can be achieved at both angle positions by achieving a compromise between this condition and each of the conditions (4) and (5) which are described below.

Conditions (4) and (5) dictate the requirements that have to be met by the lens unit $1b$. As already mentioned, the lens unit $1b$ in the prior art system of the two-group type is solely composed of either a single positive lens element or two or three positive lens elements. In accordance with the present invention, however, the lens unit $1b$ is composed of at least two negative lens element $1bn$ and at least one positive lens element $1bp$ in order to attain the purpose of providing a definitely large back focus while reducing the overall length of the lens arrangement. In addition, the unit $1b$ is required to satisfy both conditions (4) and (5) by properly selecting the power and the optical material used.

If the lower limit of condition (4) is not reached, the power of the negative lens element $1bn$ or elements in the lens unit $1b$ becomes too great to avoid overcompensation of chromatic aberration. If the upper limit of condition (4) is exceeded, the power of the negative lens element $1bn$ or elements in the lens unit $1b$ becomes too small to achieve effective compensation of chromatic aberration. If condition (5) is not met, the balance with condition (3), which is necessary for achieving effective compensation of chromatic aberration, is upset. According to the zoom lens system shown as Embodiment 4 in the specification of Unexamined Published Japanese Patent Application No. 170816/1985 the last positive lens stage of the first lens group is shown to be a cemented positive lens that is composed of negative and positive lens elements. However, the power of this cemented lens is very small $(f_s/f_{1bn} = -0.16)$ and the improvement intended in Embodiment 4 seems to be directed not to the first lens group but to the second lens group (composed of positive, negative and positive lens elements). In addition, the back focus of the system shown in Embodiment 4 is as small as about 2 mm and the value of $f_{Bs}/f_s$ is only 0.056 which is much smaller than 0.23, the lower limit of condition (6). For these reasons, the system shown in Embodiment 4 of Unexamined Published Japanese Patent Application No. 170816/1985 is not suitable for attaining the purposes of the present invention. Embodiments 2 and 3 of Unexamined Published Japanese patent Application No. 191296/1985 also show a zoom lens system wherein the final positive lens stage of the first lens group consists of a cemented positive lens that is composed of negative and positive lens elements. However, the power of the negative lens elements in the lens unit $1b$ are insufficient $(f_s/f_{1bn} = -0.560$ and $-0.638)$ and the zoom ratio attainable is no larger than 1.5. Therefore, this lens system is unable to attain the object of the present invention, i.e., providing a compact zoom lens system that has an increased back focus and which yet attains a zoom ratio of 1.7 or more.

Condition (6) shows the constraint that is placed on back focus in order to attain the purpose of providing a compact camera including the lens system and other mechanisms such as zooming and auto-focusing capabilities. If the lower limit of condition (6) is not reached, favorable conditions for attaining the purpose of reducing the overall length of the lens arrangement are provided. However, the diameter of the rear group (second lens group) is increased to such an extent that the resulting camera is by no means compact in size. If the upper limit of condition (6) is exceeded, favorable conditions for the purpose of reducing the diameter of the rear group are provided but, on the other hand, the overall length of the lens arrangement is increased to preclude the possibility of providing a compact camera.

Condition (7) dictates the requirement that has to be satisfied by the lens unit $1m$. The unit $1m$ is composed of at least one positive lens element $1mp$ which has its convex surface directed toward the image side. In accordance with the present invention, balance is struck between the two lens unit $1m$ and $1a$ so that the power of the first lens group 1 can be increased without sacrificing the purpose of achieving effective compensation of coma aberration. If the upper limit of condition (7) is exceeded, the power of the lens unit $1m$ becomes so great that overcompensation of the coma aberration occurring in the lens unit $1a$ is unavoidable. If the lower limit of condition (7) is not reached, undercompensation occurs to upset the balance between the individual lens units in the first lens group 1.

Condition (8) sets forth the requirement that has to be satisfied by the second lens group 2. The lens configuration of this second lens group 2 is substantially the same as that employed in the prior art system of the two-group type. However, in accordance with the present invention, the negative lens elements 22 and 23 in the second lens group 2 are made of an optical material having high refractive index and this enables the field curvature occurring at the wide angle position to be compensated in an effective fashion. If the lower limit of condition (8) is not reached, an excessive sagittal astigmatism will readily occur in the peripheral region at the wide angle position.

In the lens system shown in the prior application, the second lens group is composed of two units, one being a positive meniscus lens element with a large curvature that is positioned closer to the object side and which has its convex surface directed toward the image side and the other being a negative meniscus lens element with a large curvature which has its concave surface directed toward the object side. If an attempt is made to provide a zoom ratio of 1.7 or more with a lens system incorporating this arrangement of the second lens group, the increase in coma aberration and distortion is unavoidable, this being definitely undesirable for picture taking purposes. In accordance with the present invention, the negative meniscus lens element on the image side is replaced by at least two negative meniscus lens elements that have a large curvature and each of which has its concave surface directed toward the object side. By employing this arrangement, a zoom ratio of 1.7 or higher can be attained and yet distortion that occurs in the lens system can be compensated more effectively than in the system proposed by the prior application.

Seven embodiments of the zoom lens system of the present invention are hereunder described in terms of numerical data, in Tables 1–7. In these tables, f signifies the focal length, z is the zoom ratio, is the half viewing angle, $f_B$ is the back focus, $r_i$ is the radius of curvature of an individual lens surface, $d_i$ is the thickness of an individual lens or the aerial distance between adjacent lens surfaces, $N_i$ is the refractive index at d-line of an individual lens, and $\nu_i$ is the Abbe number of an individual lens element.

The shapes of the four embodiments are clearly shown in FIGS. 1, 3, 5, 7, 9, 11 and 13 respectively. Also given for each embodiment are a set of aberrational characteristics. These characteristics are displayed in separate drawings for wide angle (FIGS. 2A, 4A, 6A, 8A, 10A, 12A and 14A) medium angle (FIGS. 2B, 4B, 6B, 8B, 10B, 12B and 14C) and narrow angle (FIGS. 2C, 4C, 6C, 8C, 10C, 12C and 14C) positions of the zoom. Each characteristic drawing contains four graphs. The first graph plots spherical aberration (SA) and sine condition (SC) as a function of the aperture. The second graph plots chromatic aberration as a function of the aperture for the d-line, the g-line and the C-line. The third graph plots astigmatism in the sagittal (S) direction and the meridional (M) direction as a function of half viewing angle ω. The fourth graph plots distortion as a function of the same half viewing angle ω.

It is noted in the sixth embodiment of Table 6 that the tenth surface $r_{10}$ is aspherical. The aspherical surface is given by $$x = cy^2/(1 + \sqrt{1 - (1 + k)c^2 y^2}) + a_4 y^4 + a_6 y^6 + a_8 y^8 + a_{10} y^{10}.$$

The constants are given by
$c = 1/r_{10}$
$K = 0.0$
$a_4 = 0.17199 \times 10^{-4}$
$a_6 = -0.64881 \times 10^{-7}$
$a_8 = 0.19095 \times 10^{-8}$
$a_{10} = -0.96176 \times 10^{-11}$.

where y is the height from the optical axis, and k is the aspherical coefficient.

TABLE 1

[Embodiment 1]

1:3.5–6.7   f = 36.0–68.0   z = 1.89
ω = 30.5°–17.8°   $f_B$ = 10.39–40.86

| i | $r_i$ | $d_i$ | $N_i$ | $\nu_i$ |
|---|---|---|---|---|
| 1 | 20.136 | 2.109 | 1.69680 | 55.5 |
| 2 | 38.230 | 1.795 | | |
| 3 | −26.135 | 1.300 | 1.83400 | 37.2 |
| 4 | 387.577 | 1.719 | | |
| 5 | −153.126 | 3.500 | 1.77250 | 49.6 |
| 6 | −43.752 | 3.421 | | |
| 7 | 27.155 | 4.210 | 1.65016 | 39.4 |
| 8 | −9.493 | 1.300 | 1.80518 | 25.4 |
| 9 | −21.878 | 8.90–1.699 | | |
| 10 | −32.888 | 2.682 | 1.80518 | 25.4 |
| 11 | −15.811 | 1.254 | | |
| 12 | −19.112 | 1.500 | 1.83400 | 37.2 |
| 13 | −37.330 | 2.865 | | |
| 14 | −11.967 | 1.500 | 1.83400 | 37.2 |
| 15 | −47.652 | | | |

$f_s/f_l = 1.497$   $N_{lan} = 1.834$

TABLE 1-continued

[Embodiment 1]

$\nu_{lan} = 37.2$   $f_s/f_{lbn} = -1.648$
$\nu_{lbp} - \nu_{lbn} = 14$   $f_{Bs}/f_s = 0.289$
$f_s/f_{lm} = 0.46$   $\overline{N_{2n}} = 1.834$

TABLE 2

[Embodiment 2]

1:3.5–6.7   f = 36.0–68.0   z = 1.89
ω = 30.85°–17.8°   $f_B$ = 10.0–41.2

| i | $r_i$ | $d_i$ | $N_i$ | $\nu_i$ |
|---|---|---|---|---|
| 1 | 23.002 | 1.963 | 1.69680 | 55.5 |
| 2 | 44.778 | 1.899 | | |
| 3 | −23.164 | 1.300 | 1.83481 | 42.7 |
| 4 | −2384.334 | 1.259 | | |
| 5 | −90.174 | 6.000 | 1.74400 | 44.7 |
| 6 | −29.728 | 2.124 | | |
| 7 | 28.961 | 3.928 | 1.58267 | 46.3 |
| 8 | −10.344 | 2.244 | 1.80518 | 25.4 |
| 9 | −19.955 | 11.05–3.388 | | |
| 10 | −37.145 | 2.972 | 1.80518 | 25.4 |
| 11 | −15.613 | 1.631 | | |
| 12 | −14.904 | 1.500 | 1.83400 | 37.2 |
| 13 | −34.696 | 2.369 | | |
| 14 | −14.343 | 1.500 | 1.83400 | 37.2 |
| 15 | −56.214 | | | |

$f_s/f_l = 1.467$   $N_{lan} = 1.835$
$\nu_{lan} = 42.7$   $f_s/f_{lbn} = -1.209$
$\nu_{lbp} - \nu_{lbn} = 20.9$   $f_{Bs}/f_s = 0.278$
$f_s/f_{lm} = 0.630$   $\overline{N_{2n}} = 1.834$

TABLE 3

[Embodiment 3]

1:3.5–6.6   f = 39.0–73.0   z = 1.89
ω = 28.6°–16.6°   $f_B$ = 10.40–43.26

| i | $r_i$ | $d_i$ | $N_i$ | $\nu_i$ |
|---|---|---|---|---|
| 1 | 20.091 | 2.130 | 1.69680 | 55.5 |
| 2 | 46.182 | 1.755 | | |
| 3 | −24.112 | 1.300 | 1.83400 | 37.2 |
| 4 | 126.183 | 2.374 | | |
| 5 | −55.460 | 1.885 | 1.76200 | 40.1 |
| 6 | −22.881 | 3.755 | | |
| 7 | 27.881 | 3.857 | 1.54814 | 45.8 |
| 8 | −11.400 | 1.300 | 1.80518 | 25.4 |
| 9 | −20.767 | 11.12–2.773 | | |
| 10 | −35.550 | 2.860 | 1.80518 | 25.4 |
| 11 | −16.324 | 2.217 | | |
| 12 | −14.398 | 1.500 | 1.83400 | 37.2 |
| 13 | −35.945 | 1.996 | | |
| 14 | −16.707 | 1.500 | 1.83400 | 37.2 |
| 15 | −53.051 | | | |

$f_s/f_l = 1.450$   $N_{lan} = 1.834$
$\nu_{lan} = 37.2$   $f_s/f_{lbn} = -1.166$
$\nu_{lbp} - \nu_{lbn} = 20.4$   $f_{Bs}/f_s = 0.267$
$f_s/f_{lm} = 0.782$   $\overline{N_{2n}} = 1.834$

TABLE 4

[Embodiment 4]

1:3.5–6.3   f = 39.0–68.0   z = 1.74
ω = 28.6°–17.7°   $f_B$ = 10.81–37.86

| i | $r_i$ | $d_i$ | $N_i$ | $\nu_i$ |
|---|---|---|---|---|
| 1 | 19.352 | 2.153 | 1.69680 | 55.5 |
| 2 | 48.677 | 1.618 | | |
| 3 | −24.350 | 1.300 | 1.83400 | 37.2 |
| 4 | 113.517 | 1.247 | | |
| 5 | −29.243 | 3.293 | 1.76200 | 40.1 |
| 6 | −20.314 | 2.499 | | |
| 7 | 15.672 | 1.300 | 1.80518 | 25.4 |

TABLE 4-continued

[Embodiment 4]

| i | $r_i$ | $d_i$ | $N_i$ | $\nu_i$ |
|---|---|---|---|---|
| 8 | 8.802 | 6.000 | 1.56732 | 42.8 |
| 9 | −32.874 | 8.730−2.102 | | |
| 10 | −38.845 | 2.929 | 1.80518 | 25.4 |
| 11 | −16.322 | 1.459 | | |
| 12 | −17.543 | 1.500 | 1.83400 | 37.2 |
| 13 | −68.469 | 3.102 | | |
| 14 | −12.735 | 1.500 | 1.83400 | 37.2 |
| 15 | −30.797 | | | |

$f_s/f_1 = 1.530$    $N_{1an} = 1.834$
$\nu_{1an} = 37.2$    $f_s/f_{1bn} = -1.432$
$\nu_{1bp}-\nu_{1bn} = 17.4$    $f_{Bs}/f_s = 0.277$
$f_s/f_{1m} = 0.518$    $\overline{N_{2n}} = 1.834$

TABLE 5

[Embodiment 5]

1:3.6−5.1−7.7    $f = 39.00-55.00-83.00$
$\omega = 28.6°-21.4°-14.6°$    $f_B = 10.10-24.67-50.17$

| i | $r_i$ | $d_i$ | $N_i$ | $\nu_i$ |
|---|---|---|---|---|
| 1 | 24.834 | 1.81 | 1.69680 | 55.5 |
| 2 | 45.134 | 1.99 | | |
| 3 | −22.474 | 1.41 | 1.83481 | 42.7 |
| 4 | −151.988 | 0.34 | | |
| 5 | −54.518 | 7.00 | 1.74950 | 35.3 |
| 6 | −25.252 | 3.65 | | |
| 7 | 27.066 | 4.24 | 1.51112 | 60.5 |
| 8 | −11.617 | 2.50 | 1.80518 | 25.4 |
| 9 | −20.160 | 12.57−7.78−3.83 | | |
| 10 | −52.175 | 3.21 | 1.80518 | 25.4 |
| 11 | −17.297 | 1.87 | | |
| 12 | −15.240 | 1.63 | 1.83481 | 42.7 |
| 13 | −57.266 | 2.53 | | |
| 14 | −16.722 | 1.63 | 1.83400 | 37.2 |
| 15 | −59.282 | | | |

$f_s/f_1 = 1.468$    $N_{1an} = 1.835$
$\nu_{1an} = 42.7$    $f_s/f_{1bn} = -0.996$
$\nu_{1bp}-\nu_{1bn} = 35.1$    $f_{Bs}/f_s = 0.259$
$f_s/f_{1m} = 0.685$    $\overline{N_{2n}} = 1.834$

TABLE 6

[Embodiment 6]

1: 3.6 − 5.6 − 9.0    $f = 39.00 - 60.00 - 97.00$
$\omega = 28.5° - 19.8° - 12.6°$    $f_B = 10.10 - 28.99 - 62.29$

| i | $r_i$ | $d_i$ | $N_i$ | $\nu_i$ |
|---|---|---|---|---|
| 1 | 29.587 | 1.77 | 1.69680 | 55.5 |
| 2 | 66.847 | 1.89 | | |
| 3 | −20.327 | 1.41 | 1.83481 | 42.7 |
| 4 | −103.024 | 0.32 | | |
| 5 | −49.000 | 6.69 | 1.72342 | 38.0 |
| 6 | −22.896 | 2.99 | | |
| 7 | 31.605 | 4.25 | 1.51454 | 54.7 |
| 8 | −11.453 | 2.50 | 1.80518 | 25.4 |
| 9 | −19.530 | 13.84 − 7.99 − 3.84 | | |
| 10 | −60.655* | 3.43 | 1.80518 | 25.4 |
| 11 | −17.536 | 1.37 | | |
| 12 | −15.251 | 1.63 | 1.83400 | 37.2 |
| 13 | −34.886 | 2.47 | | |
| 14 | −15.036 | 1.63 | 1.83400 | 37.2 |
| 15 | −91.810 | | | |

*$r_{10}$ surface is aspherical $$x = cy^2/(1 + \sqrt{1 - (1 + k)c^2y^2}) + a_4y^4 + a_6y^6 + a_8y^8 + a_{10}y^{10}$$

$c = 1/r_{10}$    $a_4 = 0.17199 \times 10^{-4}$
$a_6 = -0.64881 \times 10^{-7}$    $a_8 = 0.19095 \times 10^{-8}$
$a_{10} = -0.96176 \times 10^{-11}$
$f_s/f_1 = 1.464$    $N_{1an} = 1.835$
$\nu_{1an} = 42.7$    $f_s/f_{1bn} = -0.979$
$\nu_{1bp} - \nu_{1bn} = 29.3$    $f_{Bs}/f_s = 0.256$

TABLE 6-continued $f_s/f_{1m} = 0.733$    $\overline{N_{2n}} = 1.834$ $k = 0.0$ where y is the height from the optical axis, and k is the aspherical coefficient.

TABLE 7

[Embodiment 7]

1: 3.6 − 5.6 − 9.0    $f = 39.00 - 60.00 - 97.00$
$\omega = 28.5° - 19.8° - 12.6°$    $f_B = 10.10 - 28.99 - 62.28$

| i | $r_i$ | $d_i$ | $N_i$ | $\nu_i$ |
|---|---|---|---|---|
| 1 | 30.072 | 1.74 | 1.69680 | 55.5 |
| 2 | 64.653 | 1.94 | | |
| 3 | −19.914 | 1.41 | 1.83481 | 42.7 |
| 4 | −104.190 | 0.32 | | |
| 5 | −49.065 | 7.00 | 1.72342 | 38.0 |
| 6 | −22.868 | 2.52 | | |
| 7 | 31.048 | 4.38 | 1.51454 | 54.7 |
| 8 | −11.289 | 2.50 | 1.80518 | 25.4 |
| 9 | −19.137 | 13.62 − 7.89 − 3.84 | | |
| 10 | −67.801 | 3.41 | 1.80518 | 25.4 |
| 11 | −17.895 | 1.51 | | |
| 12 | −16.677 | 1.63 | 1.83400 | 37.2 |
| 13 | −75.103 | 2.91 | | |
| 14 | −16.113 | 1.63 | 1.83400 | 37.2 |
| 15 | −65.812 | | | |

$f_s/f_1 = 1.464$    $N_{1an} = 1.835$
$\nu_{1an} = 42.7$    $f_s/f_{1bn} = -0.979$
$\nu_{1bp} - \nu_{1bn} = 29.3$    $f_{Bs}/f_s = 0.256$
$f_s/f_{1m} = 0.733$    $\overline{N_{2n}} = 1.834$

What is claimed is:

1. A zoom lens system comprising, in order from the object side, a first lens group having a positive focal length and a second lens group having a negative focal length and which achieves zooming between a wide angle position and a narrow angle position by changing the distance between the first and second lens groups, said first lens group having a positive focal length and being composed of a lens unit (a) having a negative focal length that is positioned on the object side of said first lens group and which comprises at least one positive lens element and at least one negative lens element, a lens unit (b) having a positive focal length that is positioned on the image side of said first lens group and which comprises at least one negative lens element and at least one positive lens element, and a lens unit (m) that is positioned between the lens units a and b and which comprises at least one positive lens element having its convex surface directed toward the image side, said lens system satisfying the following conditions:

(1) $1.35 < f_s/f_1 < 1.7$;
(2) $1.69 < N_{1an}$;
(3) $34 < \nu_{1an}$;
(4) $-2.0 < f_s/f_{1bn} < -0.7$;
(5) $9 < \nu_{1bp} - \nu_{1bn}$;
(6) $0.23 < f_{Bs}/f_s < 0.5$; and
(7) $0.3 < f_s/f_{1m} < 1.0$.

where
$f_s$: the focal length of the overall system at the wide angle position;
$f_1$: the focal length of the first lens group;
$N_{1an}$: the refractive index at d-line of the negative lens element in the lens unit a;
$\nu_{1an}$: the Abbe number of the negative lens element in the lens unit a;
$f_{1bn}$: the focal length of the negative lens element in the lens unit b;

$\nu_{1bp}$: the Abbe number of the positive lens element in the lens unit b;

$\nu_{1bn}$: the Abbe number of the negative lens element in the lens unit b;

$f_{Bs}$: the back focus at the wide angle position; and $f_{1m}$: the focal length of the lens unit m.

2. A zoom lens system according to claim 1, wherein said second lens group has a negative focal length being composed of, in order from the object side, a positive meniscus lens element which has a large curvature and which has its convex surface directed toward the image side and at least two negative meniscus lens elements which have a large curvature and each of which has its concave surface directed toward the object side, said second lens group satisfying the following condition:

(8) $1.7 < \overline{N_{2n}}$ where $\overline{N_{2n}}$: the average of the refractive indices at d-line of the negative lens elements in the second lens group.

3. A zoom lens system according to claim 2 wherein said lens unit a having a negative focal length comprises, in order from the object side, a positive lens element with a large curvature which has its convex surface directed toward the object side and a negative lens element with a large curvature which has its concave surface directed toward the object side, said lens unit b having a positive focal length and comprising, in order from the object side, a bioconvex positive lens element and a negative meniscus lens element cemented thereto which has its concave surface directed to the object side.

4. A zoom lens system according to claim 3, wherein an i-th one of said lens elements having radii of curvature $r_i$ and $r_{i+1}$, a thickness $d_i$, a refractive index $N_i$, an Abbe number $\nu_i$ and an aerial distance $d_{i-1}$ between separated adjacent lens elements satisfies all parts of the following table:

| i | $r_i$ | $d_i$ | $N_i$ | $\nu_i$ |
|---|---|---|---|---|
| 1 | 20.136 | 2.109 | 1.69680 | 55.5 |
| 2 | 38.230 | 1.795 | | |
| 3 | −26.135 | 1.300 | 1.83400 | 37.2 |
| 4 | 387.577 | 1.719 | | |
| 5 | −153.126 | 3.500 | 1.77250 | 49.6 |
| 6 | −43.752 | 3.421 | | |
| 7 | 27.155 | 4.210 | 1.65016 | 39.4 |
| 8 | −9.493 | 1.300 | 1.80518 | 25.4 |
| 9 | −21.878 | 8.90–1.699 | | |
| 10 | −32.888 | 2.682 | 1.80518 | 25.4 |
| 11 | −15.811 | 1.254 | | |
| 12 | −19.112 | 1.500 | 1.83400 | 37.2 |
| 13 | −37.330 | 2.865 | | |
| 14 | −11.967 | 1.500 | 1.83400 | 37.2 |
| 15 | −47.652 | | | |

5. A zoom lens system according to claim 3, wherein an i-th one of said lens elements having radii of curvature $r_i$ and $r_{i+1}$, a thickness $d_i$, a refractive index $N_i$, an Abbe number $\nu_i$ and an aerial distance $d_{i-1}$ between separated adjacent lens elements satisfies all parts of the following table:

| i | $r_i$ | $d_i$ | $N_i$ | $\nu_i$ |
|---|---|---|---|---|
| 1 | 23.002 | 1.963 | 1.69680 | 55.5 |
| 2 | 44.778 | 1.899 | | |
| 3 | −23.164 | 1.300 | 1.83481 | 42.7 |
| 4 | −2384.334 | 1.259 | | |
| 5 | −90.174 | 6.000 | 1.74400 | 44.7 |
| 6 | −29.728 | 2.124 | | |
| 7 | 28.961 | 3.928 | 1.58267 | 46.3 |
| 8 | −10.344 | 2.244 | 1.80518 | 25.4 |
| 9 | −19.955 | 11.05–3.388 | | |
| 10 | −37.145 | 2.972 | 1.80518 | 25.4 |
| 11 | −15.613 | 1.631 | | |
| 12 | −14.904 | 1.500 | 1.83400 | 37.2 |
| 13 | −34.696 | 2.369 | | |
| 14 | −14.343 | 1.500 | 1.83400 | 37.2 |
| 15 | −56.214 | | | |

6. A zoom lens system according to claim 3, wherein an i-th one of said lens elements having radii of curvature $r_i$ and $r_{i+1}$, a thickness $d_i$, a refractive index $N_i$, an Abbe number $\nu_i$ and an aerial distance $d_{i-1}$ between separated adjacent lens elements satisfies all parts of the following table:

| i | $r_i$ | $d_i$ | $N_i$ | $\nu_i$ |
|---|---|---|---|---|
| 1 | 20.091 | 2.130 | 1.69680 | 55.5 |
| 2 | 46.182 | 1.755 | | |
| 3 | −24.112 | 1.300 | 1.83400 | 37.2 |
| 4 | 126.183 | 2.374 | | |
| 5 | −55.460 | 1.885 | 1.76200 | 40.1 |
| 6 | −22.881 | 3.755 | | |
| 7 | 27.881 | 3.857 | 1.54814 | 45.8 |
| 8 | −11.400 | 1.300 | 1.80518 | 25.4 |
| 9 | −20.767 | 11.12–2.773 | | |
| 10 | −35.550 | 2.860 | 1.80518 | 25.4 |
| 11 | −16.324 | 2.217 | | |
| 12 | −14.398 | 1.500 | 1.83400 | 37.2 |
| 13 | −35.945 | 1.996 | | |
| 14 | −16.707 | 1.500 | 1.83400 | 37.2 |
| 15 | −53.051 | | | |

7. A zoom lens system according to claim 3, wherein an i-th one of said lens elements having radii of curvature $r_i$ and $r_{i+1}$, a thickness $d_i$, a refractive index $N_i$, an Abbe number $\nu_i$ and an aerial distance $d_{i-1}$ between separated adjacent lens elements satisfies all parts of the following table:

| i | $r_i$ | $d_i$ | $N_i$ | $\nu_i$ |
|---|---|---|---|---|
| 1 | 24.834 | 1.81 | 1.69680 | 55.5 |
| 2 | 45.134 | 1.99 | | |
| 3 | −22.474 | 1.41 | 1.83481 | 42.7 |
| 4 | −151.988 | 0.34 | | |
| 5 | −54.518 | 7.00 | 1.74950 | 35.3 |
| 6 | −25.252 | 3.65 | | |
| 7 | 27.066 | 4.24 | 1.51112 | 60.5 |
| 8 | −11.617 | 2.50 | 1.80518 | 25.4 |
| 9 | −20.160 | 12.57–7.78–3.83 | | |
| 10 | −52.175 | 3.21 | 1.80518 | 25.4 |
| 11 | −17.297 | 1.87 | | |
| 12 | −15.240 | 1.63 | 1.83481 | 42.7 |
| 13 | −57.266 | 2.53 | | |
| 14 | −16.722 | 1.63 | 1.83400 | 37.2 |
| 15 | −59.282 | | | |

8. A zoom lens system according to claim 3, wherein an i-th one of said lens elements having radii of curvature $r_i$ and $r_{i+1}$, a thickness $d_i$, a refractive index $N_i$, an Abbe number $\nu_i$ and an aerial distance $d_{i-1}$ between separated adjacent lens elements satisfies all parts of the following table:

| i | $r_i$ | $d_i$ | $N_i$ | $\nu_i$ |
|---|---|---|---|---|
| 1 | 29.587 | 1.77 | 1.69680 | 55.5 |
| 2 | 66.847 | 1.89 | | |
| 3 | −20.327 | 1.41 | 1.83481 | 42.7 |

-continued

| | | |  | |
|---|---|---|---|---|
| 4 | −103.024 | 0.32 | | |
| 5 | −49.000 | 6.69 | 1.72342 | 38.0 |
| 6 | −22.896 | 2.99 | | |
| 7 | 31.605 | 4.25 | 1.51454 | 54.7 |
| 8 | −11.453 | 2.50 | 1.80518 | 25.4 |
| 9 | −19.530 | 13.84 − 7.99 − 3.84 | | |
| 10 | −60.655* | 3.43 | 1.80518 | 25.4 |
| 11 | −17.536 | 1.37 | | |
| 12 | −15.251 | 1.63 | 1.83400 | 37.2 |
| 13 | −34.886 | 2.47 | | |
| 14 | −15.036 | 1.63 | 1.83400 | 37.2 |
| 15 | −91.810 | | | |

*$r_{10}$ surface is aspherical $$x = cy^2/(1 + \sqrt{1 - (1 + k)c^2y^2}) + a_4y^4 + a_6y^6 + a_8y^8 + a_{10}y^{10}$$

$c = 1/r_{10}$  $a_4 = 0.17199 \times 10^{-4}$
$a_6 = -0.64881 \times 10^{-7}$  $a_8 = 0.19095 \times 10^{-8}$
$a_{10} = -0.96176 \times 10^{-11}$
$k = 0.0$
where y is the height from the optical axis, and k is the aspherical coefficient.

9. A zoom lens system according to claim 3, wherein an i-th one of said lens elements having radii of curvature $r_i$ and $r_{i+1}$, a thickness $d_i$, a refractive index $N_i$, an Abbe number $\nu_i$ and an aerial distance $d_{i-1}$ between separated adjacent lens elements satisfies all parts of the following table:

| i | $r_i$ | $d_i$ | $N_i$ | $\nu_i$ |
|---|---|---|---|---|
| 1 | 30.072 | 1.74 | 1.69680 | 55.5 |
| 2 | 64.653 | 1.94 | | |
| 3 | −19.914 | 1.41 | 1.83481 | 42.7 |
| 4 | −104.190 | 0.32 | | |
| 5 | −49.065 | 7.00 | 1.72342 | 38.0 |
| 6 | −22.868 | 2.52 | | |
| 7 | 31.048 | 4.38 | 1.51454 | 54.7 |
| 8 | −11.289 | 2.50 | 1.80518 | 25.4 |
| 9 | −19.137 | 13.62−7.89−3.84 | | |
| 10 | −67.801 | 3.41 | 1.80518 | 25.4 |
| 11 | −17.895 | 1.51 | | |
| 12 | −16.677 | 1.63 | 1.83400 | 37.2 |
| 13 | −75.103 | 2.91 | | |
| 14 | −16.113 | 1.63 | 1.83400 | 37.2 |
| 15 | −65.812 | | | |

10. A zoom lens according to claim 2 wherein said lens unit a having a negative focal length comprises, in order from the object side, a positive lens element with a large curvature which has its convex surface directed toward the object side and a negative lens element with a large curvature which has its concave surface directed toward the object side, said lens unit b having a positive focal length and comprisng, in order from the object side, a negative meniscus lens element which has its convex surface directed toward the object side and a bioconvex positive lens cemented thereto.

11. A zoom lens system according to claim 10, wherein an i-th one of said lens elements having radii of curvature $r_i$ and $r_{i+1}$, a thickness $d_i$, a refractive index $N_i$, an Abbe number $\nu_i$ and an aerial distance $d_{i-1}$ between separated adjacent lens elements satisfies all parts of the following table:

| i | $r_i$ | $d_i$ | $N_i$ | $\nu_i$ |
|---|---|---|---|---|
| 1 | 19.352 | 2.153 | 1.69680 | 55.5 |
| 2 | 48.677 | 1.618 | | |
| 3 | −24.350 | 1.300 | 1.83400 | 37.2 |
| 4 | 113.517 | 1.247 | | |
| 5 | −29.243 | 3.293 | 1.76200 | 40.1 |
| 6 | −20.314 | 2.499 | | |
| 7 | 15.672 | 1.300 | 1.80518 | 25.4 |
| 8 | 8.802 | 6.000 | 1.56732 | 42.8 |
| 9 | −32.874 | 8.730-2.102 | | |
| 10 | −38.845 | 2.929 | 1.80518 | 25.4 |
| 11 | −16.322 | 1.459 | | |
| 12 | −17.543 | 1.500 | 1.83400 | 37.2 |
| 13 | −68.469 | 3.102 | | |
| 14 | −12.735 | 1.500 | 1.83400 | 37.2 |
| 15 | −30.797 | | | |

12. A zoom lens system according to claim 1 wherein said lens unit a having a negative focal length comprises, in order from the object side, a positive lens element with a large curvature which has its convex surface directed toward the object side and a negative lens element with a large curvature which has its concave surface directed toward the object side, said lens unit b having a positive focal length and comprising, in order from the object side, a bioconvex positive lens element and a negative meniscus lens element cemented thereto which has its concave surface directed to the object side.

13. A zoom lens according to claim 1 wherein said lens unit a having a negative focal length comprises, in order from the object side, a positive lens element with a large curvature which has its convex surface directed toward the object side and a negative lens element with a large curvature which has its concave surface directed toward the object side, said lens unit b having a positive focal length and comprisng, in order from the object side, a negative meniscus lens element which has its convex surface directed toward the object side and a bioconvex positive lens cemented thereto.

* * * * *